A. H. C. GIBSON.
SELF PROPELLED VEHICLE.
APPLICATION FILED JAN. 21, 1914. RENEWED DEC. 24, 1915.
1,192,515.
Patented July 25, 1916.
4 SHEETS—SHEET 3.
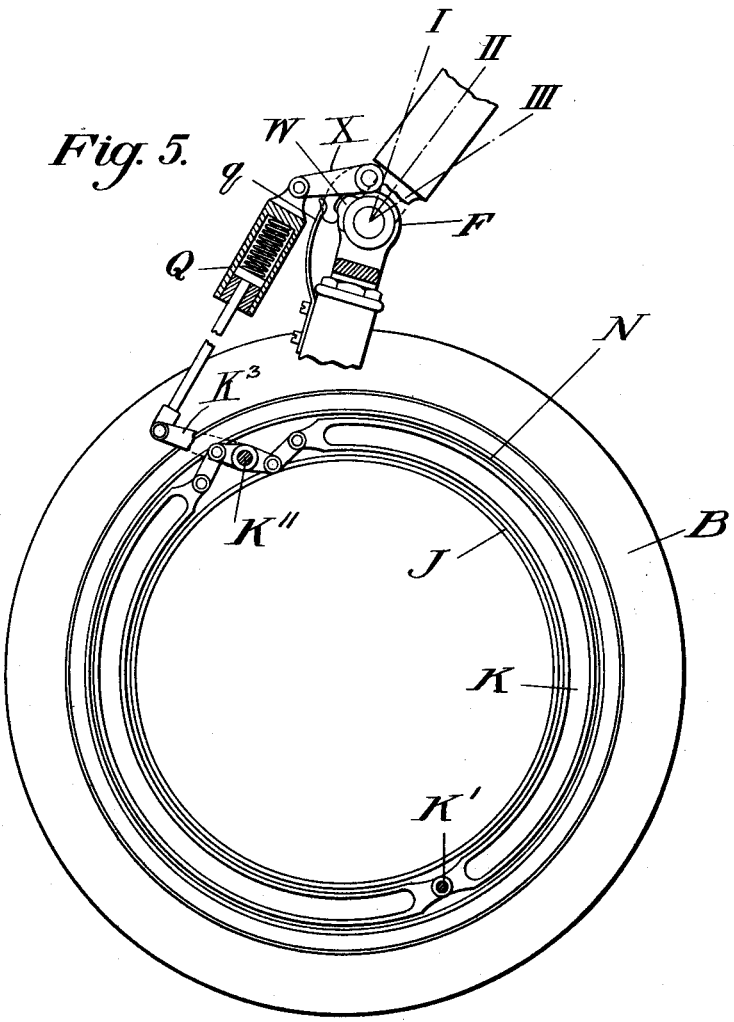
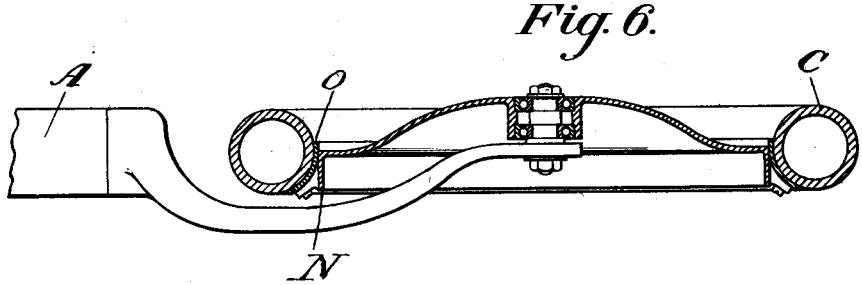

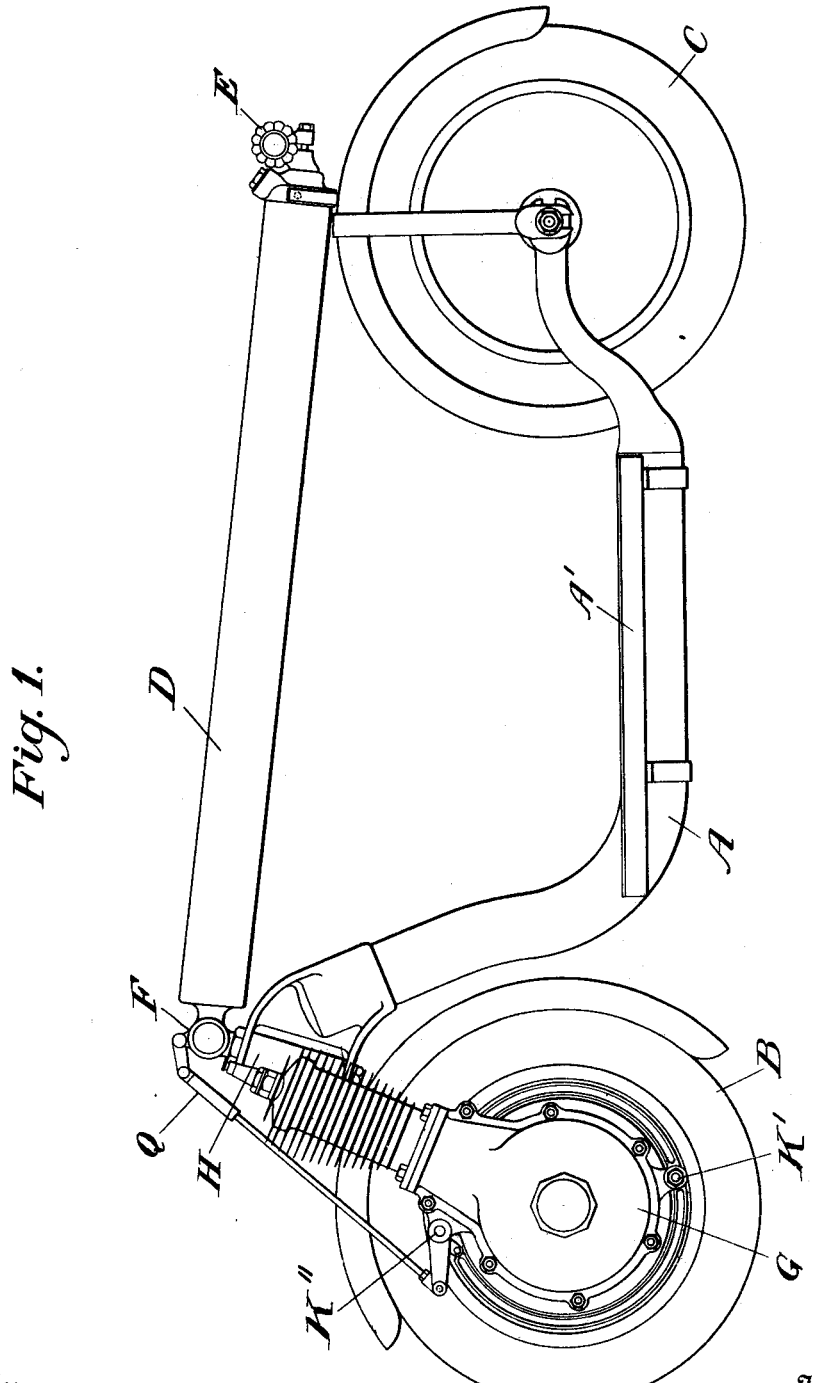

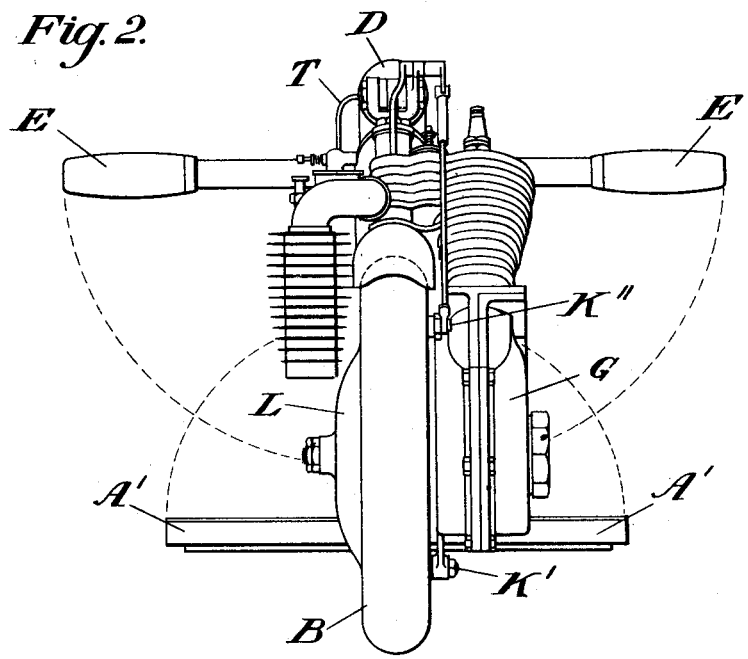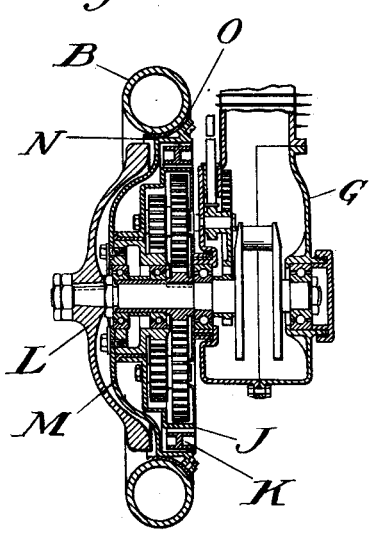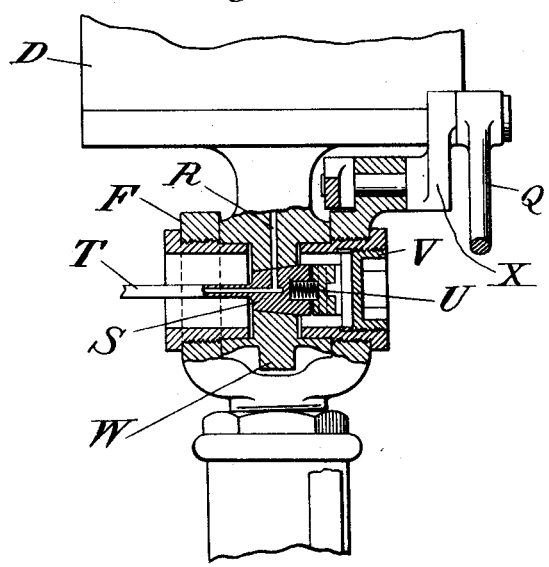

A. H. C. GIBSON.
SELF PROPELLED VEHICLE.
APPLICATION FILED JAN. 21, 1914. RENEWED DEC. 24, 1915.
1,192,515.
Patented July 25, 1916.
4 SHEETS—SHEET 4.
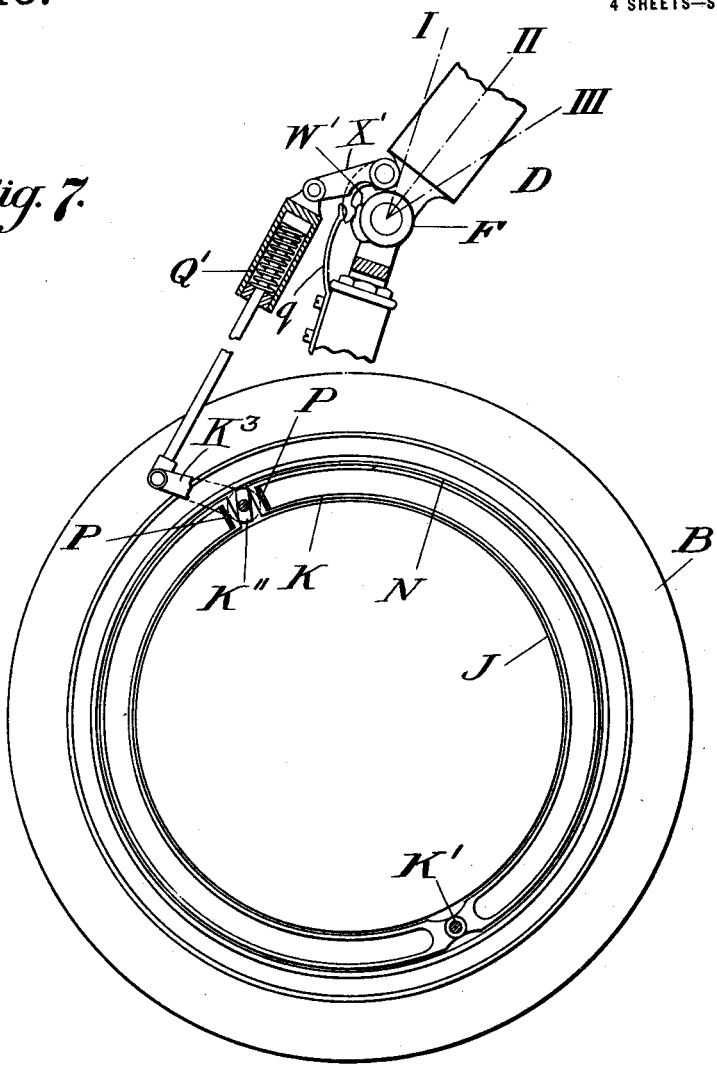
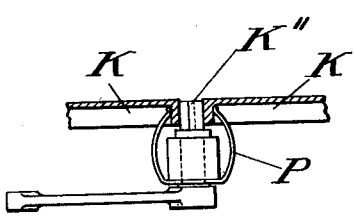

UNITED STATES PATENT OFFICE.

ARTHUR HUGO CECIL GIBSON, OF NEW YORK, N. Y., ASSIGNOR TO AUTO-PED COMPANY OF AMERICA, A CORPORATION OF DELAWARE.

SELF-PROPELLED VEHICLE.

1,192,515.      Specification of Letters Patent.      Patented July 25, 1916.

Application filed January 21, 1914, Serial No. 813,376. Renewed December 24, 1915. Serial No. 68,582.

*To all whom it may concern:*

Be it known that I, ARTHUR HUGO CECIL GIBSON, a subject of the King of Great Britain, and a resident of New York city, county and State of New York, have invented certain new and useful Improvements in Self-Propelled Vehicles, of which the following is a specification, reference being had to the drawings herein referred to, which are made a part hereof.

My invention relates to self-propelled vehicles, and more particularly has the object of producing the smallest and lightest vehicle for practical use for the transportation of persons.

In the particular form in which I have shown my invention in the accompanying drawings, the embodiment consists of two small wheels preferably carrying pneumatic tires, and having a platform between the wheels adapted for a person to stand upon. A motor propels one of the wheels, and one of the wheels is adapted to be deflected for steering, or when the vehicle is tilted to deflect its course. The platform is preferably as low as possible allowing only sufficient clearance from the ground to avoid obstacles, and as shown is below the center of the wheels. A bar or rod extends upwardly but is preferably hinged so that it may be folded down substantially to the main frame or platform. This upright is attached to the frame or wheel so that it is laterally stiff or rigid, in order that it may be used to laterally tilt the vehicle or hold it upright, and I therefore call it a stabilizing bar. I arrange for the upright to be tilted back and forth and by suitable connections effect the control of the engine or transmission, or both; and may by twisting the upright effect the steering.

As the object and the construction of my vehicle are so totally different from other self-propelled vehicles, I have designated it by the name Autoped,—as in many respects it is simply to take the place of walking, by affording a motor propelled platform on which a person usually will stand, although a seat may also be provided, and at the same time having a construction so compact, light, simple and inexpensive to make and operate, that it will accomplish a purpose in the economic life of individuals which is not afforded by any self-propelled vehicle today.

In the drawings, Figure 1 is a side elevation of a small vehicle embodying my invention; Fig. 2 is a front view of the vehicle; Fig. 3 is a section through the front wheel showing one form in which the engine and transmission are compactly housed within the steering wheel on the steering wheel axle; Fig. 4 is a detail partly in section, showing the joint between the upright and the steering post; Fig. 5 is a part view of the front wheel showing the brake and clutch control and connections; Fig. 6 is a horizontal section of the rear wheel and frame connection; Fig. 7 is a modified form of clutch and brake arrangement and connections; Fig. 8 is a detail showing the spring operating mechanism of the clutch band of the construction shown in Fig. 7.

In the figures, A is a frame and platform, B is a front driving and steering wheel, C is the rear wheel, D is the stabilizing upright which in this form is hollow and serves as a fuel reservoir, E—E are handles to twist the upright or stabilizing bar for steering.

In Fig. 1 the stabilizing bar is shown folded down as it would be when the vehicle is not in use and is required to occupy the least possible space for storage, and at such times the handle bars E—E may be folded down or collapsed, as shown by the dotted lines in Fig. 2, while the two sides of the platform shown at A' A', Fig. 2, may be folded up as indicated by dotted lines;— and when so collapsed the vehicle occupies the very minimum space possible and may be carried or stored with facility, constituting a compact oblong package without projecting parts.

At the forward end of the stabilizing bar is a joint F shown in detail in Fig. 4.

The motor G has a cylinder and crank case formed integral with a steering head H, so that through the steering head and engine casing or engine frame, the crank shaft is supported in the place of an ordinary axle or hub and also carries the transmission gearing having a casing J, which, as shown, is the usual system of planetary gearing, but which may be modified to suit any special design. About the gearing casing is a band K which serves for braking and clutching, being anchored to the engine casing at the pin K' and operated through a pivot K''. On the side of the front wheel B opposite the engine is a fly wheel L; the flange or web M of the wheel proper being between the fly wheel and the transmission casing and carrying a tire flange or rim N.

For convenience of mounting and dismounting the small tires, these tires have secured to them a rim O, adapted to receive a bolt to lock it to the rim N, thereby affording a very cheap, simple and secure means for replacing the tires.

As shown in Fig. 6 the rearward projection from the platform extends on one side of the rear wheel only, so that the hub and wheel can be readily detached for replacement, repair or packing.

The preferred form of clutching and braking mechanism is shown in Fig. 7, in which band K, in two parts, is held together at the pivot K" by means of a spring P which is made of such strength and such shape as to force the ends of the brake band K together against pivot K", which as here shown is in the form of a tappet, and when the position of this tappet permits it, the spring P will clamp the band around the casing J of the transmission and thereby hold the planetary transmission casing so that the gearing operates and drives the front wheel B—in which positoin the band K acts as an operating clutch. This is effected when the stabilizing bar D is in the position indicated by I, Fig. 7.

When it is desired to release the clutch the stabilizing bar D is moved to the position II, in Fig. 7, and when moved to position III, the connections Q' cause the pivot K" to turn, thereby expanding the ends of band K and engaging the inner side of rim N on the wheel,—whereby the brake is applied to retard the vehicle or stop it.

In the construction shown in Fig. 7, the pivot K" is actuated through its rock-arm K³, by means of a connecting rod Q' having an extensibly yielding spring connection with a bell crank X', the latter being pivoted on the yoke of the front wheel frame. A cam W' on the stabilizing bar D co-acts with the cam-arm of the bell-crank X, and a spring q presses this cam-arm against the cam.

As shown in Fig. 5 a cam W with its projections arranged reversely relatively to the cam W' shown in Fig. 7, and operating connections Q which yield in the direction of thrust, and a double toggle lever on the pivot K", linked to the ends of the brake-band K, actuate the brake-band so that when the stabilizing bar is dropped down to the position III, the brake is applied by the thrust of the cam-spring q, and when the stabilizing bar D is moved up to the position I the gear casing J is clamped and held by the brake-band K, thereby operatively connecting the engine and driving wheel, this operation being effected by the thrust of the cam W'. Thus in the construction shown in Fig. 7 the thrust of the cam W' applies the brake while in the construction shown in Fig. 5 the thrust of the reversely arranged cam W operates the clutch. In both constructions any further downward movement of the stabilizing bar D beyond the position III, as when folding the stabilizing bar down as shown in Fig. 1, has no further effect. The parts are shown in Figs. 5 and 7 in the intermediate or neutral positions corresponding to the position II of the stabilizing bar D, the clutch being open and the brake off. The pivoting of the bell-crank X upon the yoke of the front wheel frame is particularly shown in Fig. 4.

In the joint shown in Fig. 4 a small hole R through the fitting of the end of the bar D serves to carry gasolene or other fuel from the hollow stabilizing bar to the center of the pivot F, where a plug S has a slot in one side which connects with a central hole and to a pipe T, carrying fuel to the carbureter. A small spring U is held against the plug S by a cap V, engaging the plug by means of an Oldham coupling so that a tight joint is preserved between the plug and the joint end of the bar extension to insure connection between the hole R, and the slot in the plug at all positions of inclinations of the stabilizing rod D, except that the slot in plug S is limited in extent, so that when the stabilizing bar D passes beyond the position III, the hole R is closed by the plug, thereby automatically shutting off the gasolene supply when the stabilizing bar is folded down and the vehicle out of use.

In general, this is a further development of my invention, as set forth in application filed July 26, 1913, Serial No. 781,297. I have herein sought to further simplify the construction and make it more compact, light and cheaper to construct.

By using the engine casing or engine frame to support the elements collocated with the engine, as well as to carry the steering and driving wheel I effect a large reduction in weight and produce compactness;— while this particularly permits a very narrow transverse extent of the machine when not used. To still further reduce the width when the machine is housed or stored I arrange to fold up the sides of the platform and fold down the steering handles by providing joints in any known manner. The method of mounting each wheel and frame connecting it will be noted, permitting me to remove the tires from the side of either the driving or trailing wheel, without disconnecting any other part of the mechanism, which is an entirely new feature in two wheel single track vehicles, because as heretofore constructed forks have been used straddling the wheels.

Many of the details of construction as shown are novel in themselves as fully appears from the figures of the drawings;

while some of these elements may be used independently of the others, and various features and their arrangement may be changed without departing from my invention.

What I claim and desire to secure by Letters Patent is:

1. In a self-propelled vehicle, in combination, two wheels in tandem, an engine for driving one of said wheels, a shaft forming an axle for said drive wheel, said engine having a frame supported on said axle, a vehicle frame on which the other wheel is mounted, said engine frame having a pivotal steering connection with said vehicle frame, a platform on said vehicle frame for the rider to stand upon, and a stabilizing upright at the forward end of said vehicle frame.

2. A self-propelled vehicle adapted to carry a person standing thereon, such vehicle comprising two wheels in tandem, a drop frame between said wheels, an engine, said engine having a frame supporting one of said wheels and connected to one end of said drop frame, a substantially upright stabilizing bar, and connections with said drop frame for holding said bar laterally rigid.

3. A self-propelled vehicle adapted to carry a person standing thereon, such vehicle comprising two wheels in tandem, an intermediate frame, a platform on said frame in close proximity to the plane of the lowest points of the vehicle, an engine for driving one of said wheels, the engine having a frame connected to one end of said intermediate frame, and transmission mechanism supported by said engine frame substantially within said driving wheel.

4. A self-propelled vehicle adapted to carry a person standing thereon, such vehicle comprising wheels in tandem one of which is a driving wheel, an intermediate frame, a platform on said frame at a level substantially below the centers of the wheels, an engine, transmission mechanism for connecting the engine to the driving wheel, the engine having a frame supporting the driving wheel on the intermediate frame, a combined brake and clutch mechanism coöperative with the driving wheel and with the transmission mechanism, and a control bar at the forward end of said frame mounted for substantially forward and back movement for operating said brake and clutch mechanism.

5. In a vehicle, in combination, two wheels in tandem relation, an intermediate frame supporting one of the wheels, the other wheel being a steering wheel, and a steering frame for the steering wheel located on one side only of the steering wheel and pivoted on the intermediate frame.

6. In a vehicle, in combination, two wheels in tandem, and an intermediate frame having a projecting wheel-supporting extension located at one side only of the wheel which it supports.

7. In vehicle, in combination, a frame, a road wheel, and means for supporting the wheel on the frame located at one side only of the wheel, the wheel having a tire-supporting rim provided with a flange at one side only adjacent to the wheel-supporting means, whereby the tire may be removed from or placed upon said wheel rim from the other side thereof and without detachment of any other parts.

8. In a self-propelled vehicle, in combination, two wheels in tandem, an engine for driving one of said wheels, said engine having a frame supported on the driving wheel and having a crank shaft concentric with the axis of the driving wheel, a vehicle frame on which the other wheel is mounted, said engine frame having a pivotal steering connection with said vehicle frame, a platform on said vehicle frame for the rider to stand upon, and a stabilizing upright at the forward end of said vehicle frame.

9. A self-propelled vehicle having, in combination, a forward driving and steering wheel, a rear wheel, an intermediate frame, an engine for driving the forward wheel, an articulated stabilizing and control bar extending from the forward end of the frame and having controlling movement on its articulation and adapted to be folded when the vehicle is not in use, transmission mechanism for the engine controlled by said bar, a brake also controlled by said bar, and means for supplying fuel to the engine controlled by said bar to cut off the fuel supply in the folded position of said bar.

10. A self-propelled vehicle having, in combination, two wheels in tandem, a frame therefor, an upright stabilizing bar pivotally connected to the frame, said bar forming a fuel tank, an engine, and fluid-conveying connections through the pivot of the stabilizing bar adapted to automatically cut off the fuel supply from the engine in certain positions of said bar.

11. A self-propelled vehicle adapted to carry a person standing thereon, such vehicle comprising two wheels in tandem, an intermediate frame, a platform on said frame in close proximity to the plane of the lowest points of the vehicle, an engine for driving one of said wheels, said engine having a frame connected to one end of said intermediate frame, said engine frame being supported on the driving wheel and the engine having a crank shaft concentric with the axis of the driving wheel, transmission mechanism for connecting the crank shaft of the engine to the driving wheel, a combined brake and clutch mechanism coöperative with the driving wheel and with the transmission mechanism, and a control bar at the forward end of the intermediate frame mounted for substantially forward and back movement for operating said brake and clutch mechanism.

12. In a self-propelled vehicle, in combination, two wheels in tandem, an intermediate frame, an engine for driving one of said wheels and having its crank shaft concentric with the axis of the driving wheel, transmission mechanism for connecting the crank shaft of the engine with the driving wheel, a combined brake and clutch mechanism coöperative with the driving wheel and with the transmission mechanism, and a control bar at the forward end of the intermediate frame mounted for substantially forward and back movement for operating said brake and clutch mechanism.

13. A self-propelled vehicle having, in combination, a driving wheel, an engine, transmission mechanism for connecting the engine to the driving wheel, a combined brake and clutch mechanism coöperative with the driving wheel and with the transmission mechanism, and a hinged control bar movable to different positions for operating said brake and clutch mechanism.

14. In a vehicle, in combination, two wheels in tandem one of which is a steering wheel, a foldable steering and stabilizing bar, and foldable handle bars carried by the steering and stabilizing bar.

15. In a vehicle, in combination, two wheels in tandem one of which is a steering wheel, an intermediate frame, a backwardly foldable steering and stabilizing bar hinged at the front of the frame, laterally projecting foldable handle bars on the steering and stabilizing bar, and a platform having sections mounted on the intermediate frame to fold upward.

16. In a self-propelled vehicle, in combination, two wheels in tandem, an engine for driving one of said wheels, said engine having a frame supported on the driving wheel and having a crank shaft concentric with the axis of the driving wheel, and transmission mechanism supported by the engine frame substantially within the peripheral portions of the driving wheel.

17. In a self-propelled vehicle, in combination, two wheels in tandem, an intermediate frame, an engine for driving one of said wheels, said engine having a frame pivoted on the intermediate frame for steering movement and supported on the driving wheel which is also a steering wheel, the engine having a crank shaft concentric with the axis of the driving wheel, transmission mechanism supported by the engine frame substantially within the peripheral portions of the driving wheel, and a steering and stabilizing member connected to the engine frame.

In testimony whereof, I have signed my name to this specification, in the presence of two subscribing witnesses, this 19" day of January, 1914.

ARTHUR HUGO CECIL GIBSON.

Witnesses:
   H. D. DABURY,
   H. MUCHMORE.

Copies of this patent may be obtained for five cents each, by addressing the "Commissioner of Patents Washington, D. C."